Figure 3:
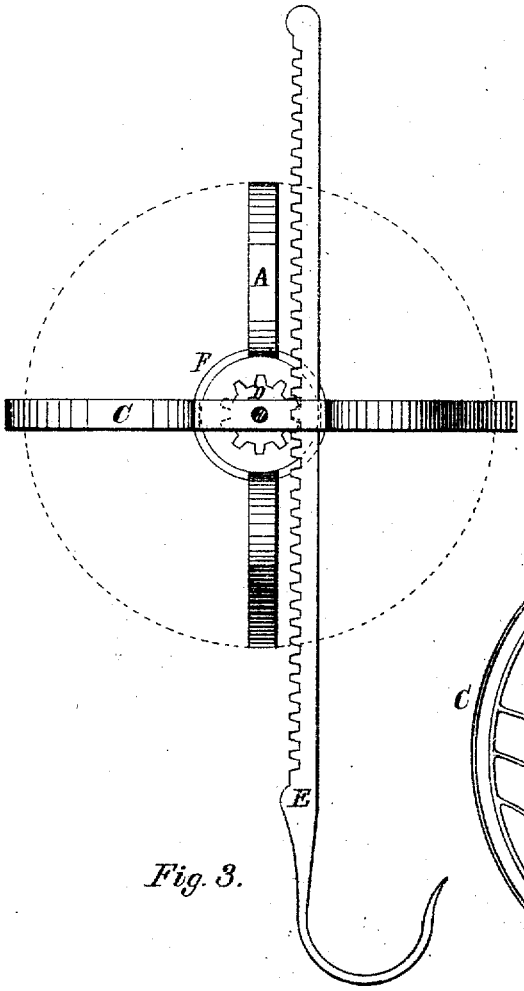

2 Sheets--Sheet 1.

T. EARLE.
Egg-Beater.

No. 6,542. Reissued July 13, 1875.

Witnesses.

N. C. Lombard

Wm. C. Hibbard

Inventor.

Timothy Earle

2 Sheets--Sheet 2.

T. EARLE.

Egg-Beater.

No. 6,542.

Reissued July 13, 1875.

Witnesses.

N. G. Lombard

Wm. C. Hibbard

Inventor.

Timothy Earle

UNITED STATES PATENT OFFICE

TIMOTHY EARLE, OF LINCOLN, R. I., ASSIGNOR, BY MESNE ASSIGNMENTS, TO THE DOVER STAMPING COMPANY, OF BOSTON, MASS.

IMPROVEMENT IN EGG-BEATERS.

Specification forming part of Letters Patent No. 39,134, dated July 7, 1863; reissue No. 6,542, dated July 13, 1875; application filed June 8, 1875.

*To all whom it may concern:*

Be it known that I, TIMOTHY EARLE, of Lincoln, (formerly Smithfield,) in the county of Providence and State of Rhode Island, have invented certain new and useful Improvements in Egg-Beaters; and I do hereby declare that the following specification, taken in connection with the drawing making a part of the same, is a full, clear, and exact description thereof.

Figure 1:
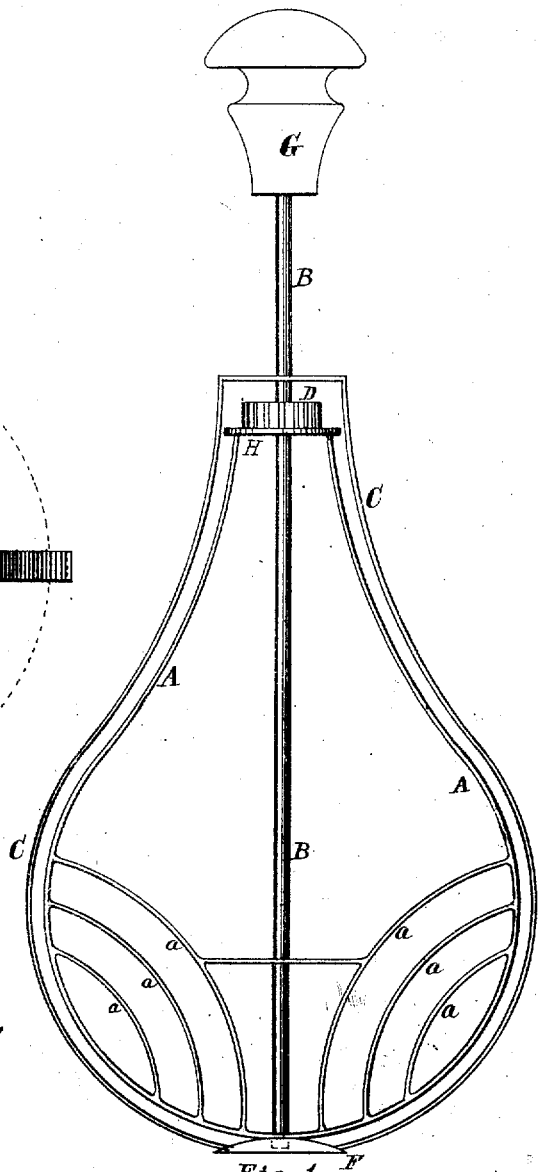
Figure 2:
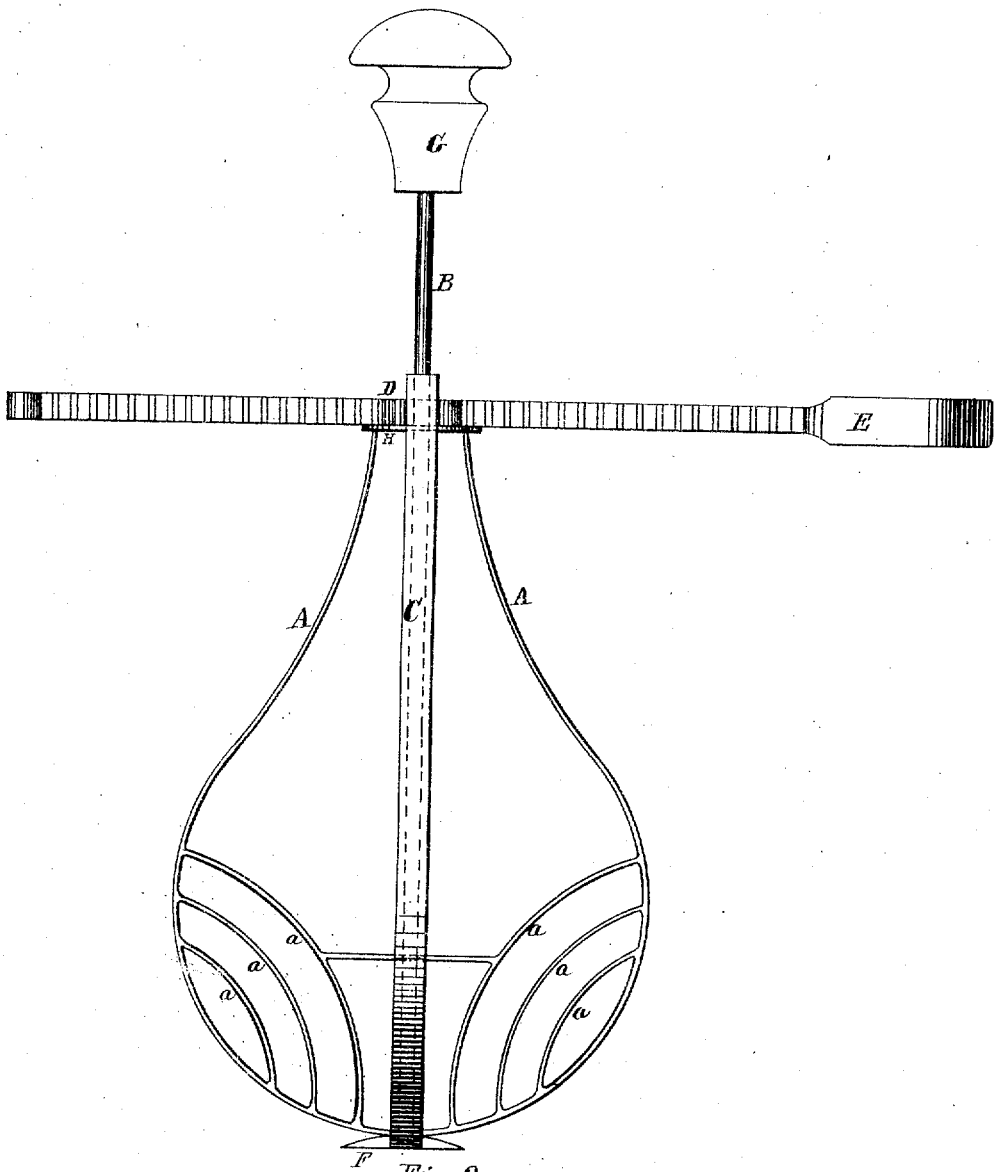

Figure 1 is a view of the beater. Fig. 2 is another view of the same, with the rack which works it shown. Fig. 3 is a top view of the same.

Various devices have been employed for the purpose of beating eggs more expeditiously than by the familiar hand process. One of these devices consists of two wire frames, one within the other, and made to revolve in opposite directions; another consists of a propeller-blade inside of a wire frame, the frame and blades being made to revolve in opposite directions; and still another consists of a propeller-blade, which is made to rotate, while a pair of beaters have, at the same time, a reciprocating motion.

All these machines, and all others with which I am acquainted, possess the common fault that the beaters, whether of wire or of the form of propeller-blades, do not cut the yolk and white of the egg, but literally beat them.

Now, as the albumen of an egg consists of a peculiar thick glairy substance, it can be worked more effectually with a cutting instrument than with one which has a blunt edge. In fact, so well is this understood that housewives commonly make use of the blade of a knife for the purpose.

My invention is designed to obviate the difficulty referred to; and consists in the use of a revolving frame, A, formed of thin strips of metal of the form shown, and mounted upon a spindle, B, around which it can freely rotate; and also of an outer fixed frame, C, of the same general form as the inner one, but large enough to permit the inner frame to rotate within it. The outer frame is attached to the spindle B, and with it furnishes a support or frame for the operative parts of the machine. The inner frame is further provided with a series of cutters or blades, *a a*, &c., arranged in any manner suitable for cutting through the fluid in many different places. These cutters or blades are simply pieces of sheet-tin or other suitable metal of the width of the inner frame, and are attached to the same by their ends, as is shown, and they are all so placed that their edges shall cut the material to be agitated when the frame A is rotated. The blades which form the outer fixed frame C are also placed in a similar position, and when the machine is in operation, cut through the current of material which is carried past them by the revolving frame, and thus aid in the operation in a similar manner. Upon the top of the frame A is attached a toothed wheel, D, through which, by means of the rack E, Fig. 3, worked by the hand, a rotatory motion is given to the inner frame A in alternate directions. The frame C, at its upper end, is so formed and arranged in relation to the pinion D as to leave the proper space between them, upon either side, to receive the rack E, and serve as a guide or bearing to keep the rack in gear with the pinion; and H is a circular flange attached to the lower side of the pinion to prevent the rack from falling down.

My invention also relates to the method of holding the machine in position while it is used. In the previous machines for this purpose the machine has been generally attached to or supported upon and in connection with the vessel which contained the materials to be operated upon, thus requiring a specific kind of vessel for the purpose, which, in effect, formed part of the machine; or the frame of the machine was fixed to some stationary object, with the revolving beater or beaters projecting downward below the machine into the vessel which contained the matters to be treated, the vessel being held below the machine, and entirely detached from it. But by my improvement the machine becomes a separate detached implement, which can be used in any vessel, and without any mechanical fastening of the machine to the vessel or to any other object. This part of my invention, therefore, consists in providing the bottom of the fixed frame C of the machine with a foot, F, or other suitable support, to rest upon the bottom of the vessel to support the lower part of the machine and raise the revolving beater-frame A above the fixed frame C sufficiently to permit it to revolve freely; and also providing the top of the machine with a handle, G, by which the machine can be held upright upon the bottom of the vessel by one hand, while the beater-frame is operated by the other, as is described.

When the machine is to be used it is placed with its foot F resting upon the bottom of the vessel containing the broken eggs. The left hand bears upon the handle G and holds the machine in position. The rack E, held by the handle in the right hand, is engaged with the pinion D, and the proper motion imparted to the frame A.

It is obvious that a continuous rotatory motion may be easily imparted to the frame A by means of a crank and suitable gearing, and the beneficial effect of the blades or cutters A *a*, &c., would be obtained as well; but I prefer the method described of communicating motion to the frame A, for the reason that the machine is more easily cleaned and is more convenient for domestic use.

What I claim is—

1. The revolving beater-frame formed of thin plain blades or cutters, arranged to cut edgewise through the material by their rotation, substantially as described.

2. The combination of the fixed frame, which contains and supports the operative machinery, provided with a foot or support at the bottom, the handle at the top, and suitable mechanism for rotating the beater, substantially as described.

Executed June 3, 1875.

TIMOTHY EARLE.

Witnesses:
N. C. LOMBARD,
WM. C. HIBBARD.